United States Patent [19]

Keyes et al.

[11] Patent Number: 4,462,261
[45] Date of Patent: Jul. 31, 1984

[54] MASS AND VELOCITY FLOWMETER

[75] Inventors: Marion A. Keyes, Chagrin Falls; William L. Thompson, Chardon, both of Ohio

[73] Assignee: The Babcock & Wilcox Company, New Orleans, La.

[21] Appl. No.: 372,369

[22] Filed: Apr. 27, 1982

[51] Int. Cl.³ .......................... G01F 1/66; G01F 1/86
[52] U.S. Cl. .............................. 73/861.02; 73/861.27
[58] Field of Search ........... 73/861.02, 861.03, 861.27, 73/599

[56] References Cited

U.S. PATENT DOCUMENTS

| | | | |
|---|---|---|---|
| 2,966,057 | 12/1960 | Heller | 73/599 |
| 4,015,470 | 4/1977 | Morrison | 73/861.03 |
| 4,102,186 | 7/1978 | Brown | 73/861.27 |
| 4,162,630 | 7/1979 | Johnson | 73/861.27 |
| 4,265,125 | 5/1981 | Mahany | 73/861.03 |

*Primary Examiner*—Herbert Goldstein
*Attorney, Agent, or Firm*—Vytas R. Matas; Robert J. Edwards

[57] ABSTRACT

A device is disclosed for measuring the mass and velocity of a fluid flowing in a conduit, in a flow direction, which comprises a pair of signal transducer arrays each disposed at planes extending through the conduit and spaced in the flow direction. Each transducer of each array is adapted to transmit a signal and receive all signals of all other transducers so that a variety of signal paths are established through the flow both transversely to the flow and in the flow direction. Differences in transit times between arrays are used to measure velocity and attenuation of the signal within an array are used to determine density. The density and velocity measurements are combined to determine mass flow.

1 Claim, 2 Drawing Figures

MASS AND VELOCITY FLOWMETER

FIELD AND BACKGROUND OF THE INVENTION

The present invention relates in general to flowmeters and in particular to a new and useful flowmeter which is capable of measuring both mass and velocity, despite non-uniform flow and density profiles.

The least complex acoustic (ultrasonic) flow meter uses a single pair of transducers in the flow to be measured, one upstream and one downstream. These alternately send and receive. The difference in transit time between the upstream direction and the downstream direction is related to the flow velocity. One of the shortcomings of this technique is that the flow is not uniform across a pipe or conduit. The single pair flowmeter requires a correction factor based on assumed flow distribution.

Multiple pairs of transducers are used in some flowmeters to allow summation of flows over the individual paths. This still requires assumptions about the flow profiles. Elaborate numerical integration schemes are used to make corrections.

These flowmeters give only velocity flow. Mass flow may be computed knowing the flow pattern and the density of the fluid involved. Problems arise, however, when the density is not uniform in space and/or time.

Density is measured by several techniques, including signal attenuation (e.g. gamma, acoustic, or optical), capacitance, etc. The attenuation and capacitance measurements are affected by uneven distributions.

Mass flow can be measured by using a momentum/stress conversion, but this is difficult to implement since it requires a special curved conduit, and other measures.

References which are pertinent in understanding the invention are U.S. Pat. No. 4,109,523 to Teyssandier; U.S. Pat. No. 4,024,760 to Estraea Jr., U.S. Pat. No. 3,940,985 to Wyler; and U.S. Pat. No. 3,778,614 to Hounsfield. These patents all disclose flow measuring techniques which utilize various irradiated signals such as sound and electromagnetic signals.

Other pertinent references are: Scudder, Henry J., "Introduction to Computer Aided Tomography", Proceedings of the IEEE, Volume 66, No. 6, June 1978. Pages 628–637; Mersereau, R. M., "Digital Reconstruction of Multidimensional Signals from their Projections", Proceedings of the IEEE, Volume 62, No. 10, Oct. 1974. Pages 1319–1338; and Raptis, et al., "Instrumentation for Process Control by Acoustic Techniques in Coal Conversion Plants", Proceedings of 1979 JACC, Pages 437–442.

SUMMARY OF THE INVENTION

The present invention is drawn to a device for measuring both mass and velocity of a flowing fluid.

Accordingly, one object of the present invention is to provide a device for measuring mass and velocity of fluid flowing in a conduit in a flow direction which comprises a first plurality of signal transmitting and receiving transducers in a first plane passing through the conduit and across the flow direction, said first plurality of signal transmitting and receiving transducers in a second plane passing through the conduit and across the flow direction at a position downstream of said first plane in the flow direction, and circuit means connected to all of said first and second plurality of transducers for applying a signal to each of the first and second plurality of transducers, and for processing a signal received by each of said first and second plurality in transducers from each other of said first and second plurality of transducers.

A further object of the invention is to provide the first and second planes perpendicular to the flow direction.

A still further object of the present invention is to provide at least four signal transducers at each of the first and second planes.

Another object of the invention is to provide a method of measuring mass and velocity in a fluid flowing in a conduit having first and second pluralities of signal transmitting and receiving transducers at first and second planes extending across the conduit at spaced locations in the flow direction, comprising applying a signal to each of the transducers for transmission from each of the transducers and receiving a transmitted signal by each of the transducers by each other of the transducers.

A still further object of the invention is to provide a device for measuring mass and velocity in a flowing medium which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
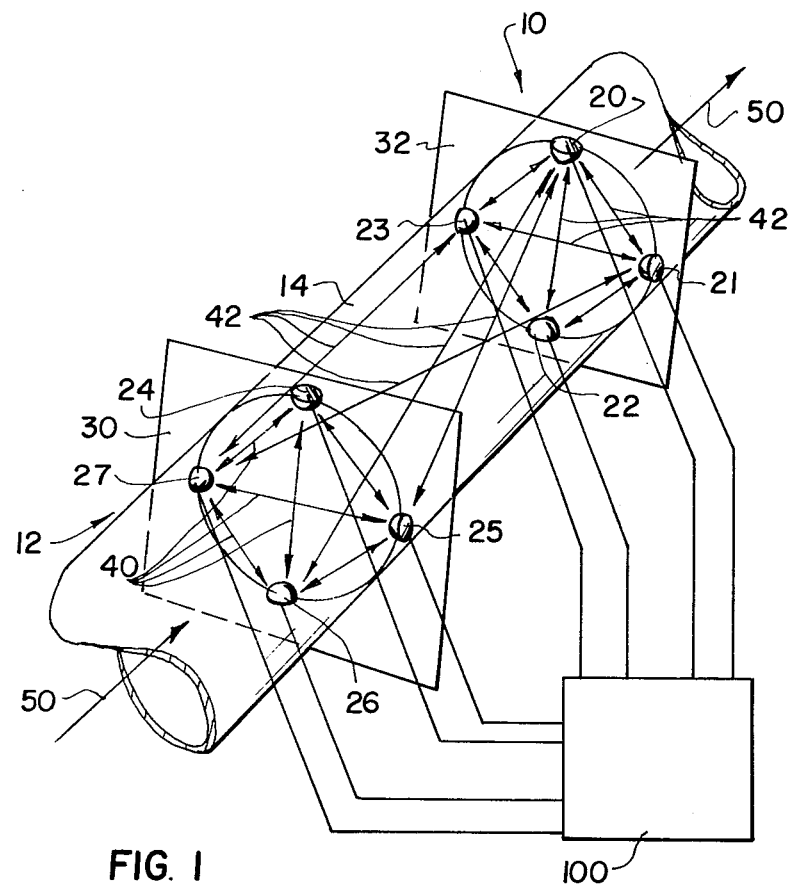
FIG. 1 is a schematic perspective view of a conduit for receiving a flow of fluid having transducers disposed therearound and a circuit in accordance with the invention.

Referring to FIG. 1 in particular, the invention embodies comprises a device for measuring the mass and velocity of a fluid flowing in a flow direction 50, in a conduit 40.

Transducer arrays 10, 12 are located on the circumference of both ends of a short length of the flow conduit 14. Each transducer 20 to 27 "talks" to every other transducer in both arrays, giving multiple passes through incremental volumes of the fluid moving in the direction of arrow 50. Differences in transit times between a sensor in one set and a sensor in the other set give the fluid velocity in that path. Attenuation characteristics give the density. Typically, density would be determined within the cross section 32 or 34 within either set of transducers 10 or 12 (arrows 40) and velocity for the volume defined between the two sets of transducers (arrows 42).

The equation of the velocities and attenuations for the many paths contain multiple measurements of each element of flow. These are typically solved using matrix inversion techniques in a dedicated microcomputer to give the velocity and mass flow.

This technique will give detailed flow patterns including the laminar or turbulent characteristic of the flow since it is a three dimensional measurement. See for example the Scudder article in IEEE, cited above, which is here incorporated by reference.

The technique used in Computer-Aided-Tomography (CAT) can be used in conjunction with multiple path acoustic sensor combinations to provide a velocity measurement with a spatial distribution. Information on density distribution can be obtained by using attenuation measurements for the multipath acoustic sensors or for other source/sensor combinations as gamma ray, optical capacitance, etc.

The product of the velocity distribution with the density distribution gives a very good measure of the mass flow.

According to a preferred embodiment of the invention, transducers 20 to 27 are ultrasonic sugnal transmitting/receiving units which are each connected to a sound generating/sound analyzing circuit 100. Each transducer emits a special signal which is in time sequence with the others. A transducer is pulsed and all the received signals on the remaining units are processed for timing and received amplitude. Then this is repeated by pulsing the others in sequence until all have been acticated. The data thus obtained is stored in memory for the calculation process.

Figure 2:
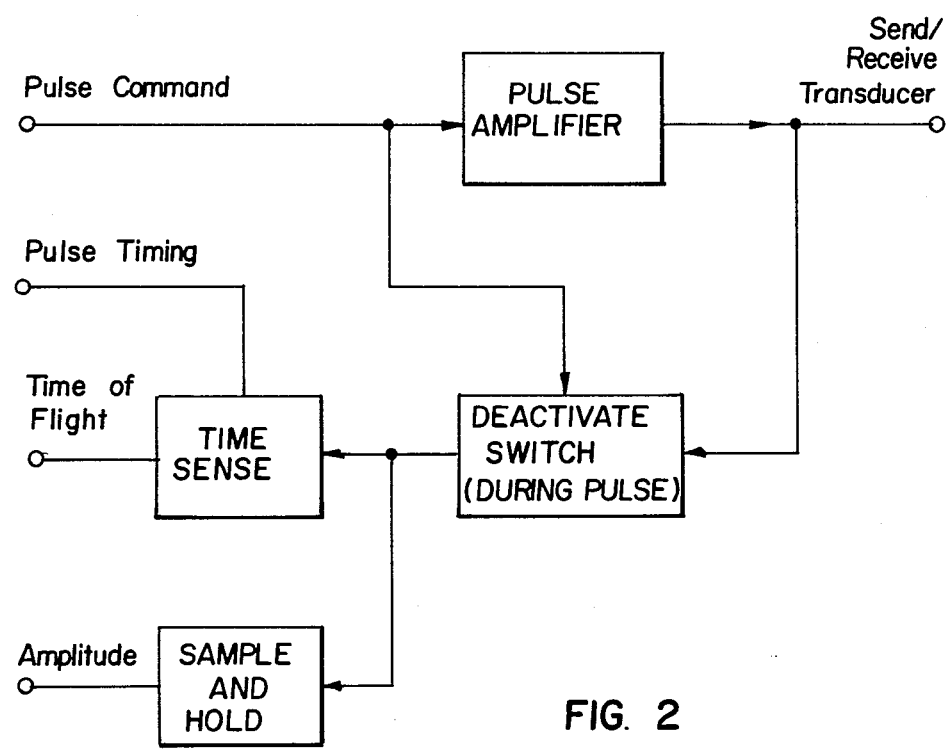
FIG. 2 provides a block diagram of the send/receive electronics for an individual transducer. One such assembly is included, in 100 of FIG. 1, for each transducer in the system.

FIG. 2 shows the electronics associated with an individual sensor. The circuit receives a pulse command and the pulser sends a pulse to the transducer. The receiving circuit is deactivated when its channel is being pulsed. When another circuit (or transducer) is being pulsed, a pulse timing signal is received. This starts a timer in the timing sense circuit. The received signal stops the timer. The timer then provides an output proportional to the transit time of the pulse to that sensor. The sample and hold circuit detects and stores the amplitude of the received signal, which is then converted to digital form by an analog to digital converter and stored in the microcomputer's memory. The timing signal is also stored by the microcomputer in its memory. The plurality of channels are stored in memory and the next transducer is pulsed.

The speed of the electronics and acoustic transmission is fast enough relative to the flow velocity that sequentially pulsing and storing essentially gives a stationary picture of the flow.

While a specific embodiment of the invention has been shown and described in detail to illustrate the application of the principles of the invention, it will be understood that the invention may be embodied otherwise without departing from such principles.

What is claimed is:

1. A method of measuring mass flow in a fluid flowing in a conduit in a flow direction, with a first plurality of signal transmitting and receiving transducers distributed in a first plane passing through the conduit and across the flow direction, and a second plurality of signal transmitting and receiving transducers distributed in a second plane passing through the conduit and across the flow direction downstream of said first plane, comprising;
    applying a signal to each of said transducers to be transmitted through the fluid;
    receiving each signal of each transducer using each other transducer;
    measuring the attenuation of the signals between the first plane transducers to determine the density of the fluid;
    measuring the difference in signal transit times downstream and back transducers in said first plurality of transducers and transducers in said second plurality of transducers to determine the velocity of the fluid; and
    utilizing the velocity measurement and the density measurement to determine the mass flow of the fluid.

* * * * *